United States Patent [19]

Souder

[11] 4,156,626
[45] May 29, 1979

[54] METHOD AND APPARATUS FOR SELECTIVELY HEATING DISCRETE AREAS OF SURFACES WITH RADIANT ENERGY

[76] Inventor: James J. Souder, 630 Archwood, Ann Arbor, Mich. 48103

[21] Appl. No.: 816,503

[22] Filed: Jul. 18, 1977

[51] Int. Cl.² .................. B29C 19/02; F24H 9/02; H05B 1/00
[52] U.S. Cl. .................. 156/272; 219/349; 219/354
[58] Field of Search .............. 156/272, 380, 359, 499; 219/339, 342, 347, 348, 349, 354, 85 BA, 85 BM; 93/DIG. 1; 219/121 L, 121 LM

[56] References Cited

U.S. PATENT DOCUMENTS

| | | | |
|---|---|---|---|
| 1,762,325 | 6/1930 | Blair et al. | 219/349 |
| 2,553,259 | 5/1951 | Hagedorn | 219/349 |
| 2,622,053 | 12/1952 | Clowe et al. | 156/272 |
| 3,384,526 | 5/1968 | Abramson et al. | 219/349 |
| 3,560,291 | 2/1971 | Foglia et al. | 219/121 LM |
| 3,731,055 | 5/1973 | Kerchner | 219/349 |
| 3,977,306 | 8/1976 | Flynn | 93/DIG. 1 |

FOREIGN PATENT DOCUMENTS 383360  10/1923  Fed. Rep. of Germany .......... 219/347

*Primary Examiner*—Douglas J. Drummond
*Attorney, Agent, or Firm*—Krass & Young

[57] ABSTRACT

A method and apparatus are disclosed for heating discrete areas of a surface bearing a thermoplastic or heat-activated adhesive or coating for the purpose of producing a thermal sealing of the surface with respect to another contacted surface as in the thermal sealing of flaps of paperboard containers. The method consists of the utilization of a radiant energy source focused onto the seal area to be activated. The radiant energy source is selected to have characteristics enhancing the focusability of its emissions, i.e., approximating a point source and having a relatively high proportion of visible and near visible range wavelength emissions. The method further includes treating of the discrete surface area with a marking absorbent of the focused radiant energy placed on the surface or by pigmenting the thermoplastic adhesive or coating itself, with the remainder of the surface being reflective to the focused radiant energy so as to control the absorption pattern of the focused radiant energy to thus cause it to be maximized in the confines of the discrete area. The focusing of the radiant energy pattern size is controlled in order to readily vary the size of the surface area upon which the radiant energy is focused so as to vary the area heated and/or to vary the intensity of heating of the area. The power output of the radiant energy source is also disclosed as being varied in accordance with the intensity of the heat energy required for the particular conditions under which the heating process is carried out, such as the speed with which the sheet material is moved past the radiant energy source, the absorbtivity or the pattern size required.

6 Claims, 7 Drawing Figures

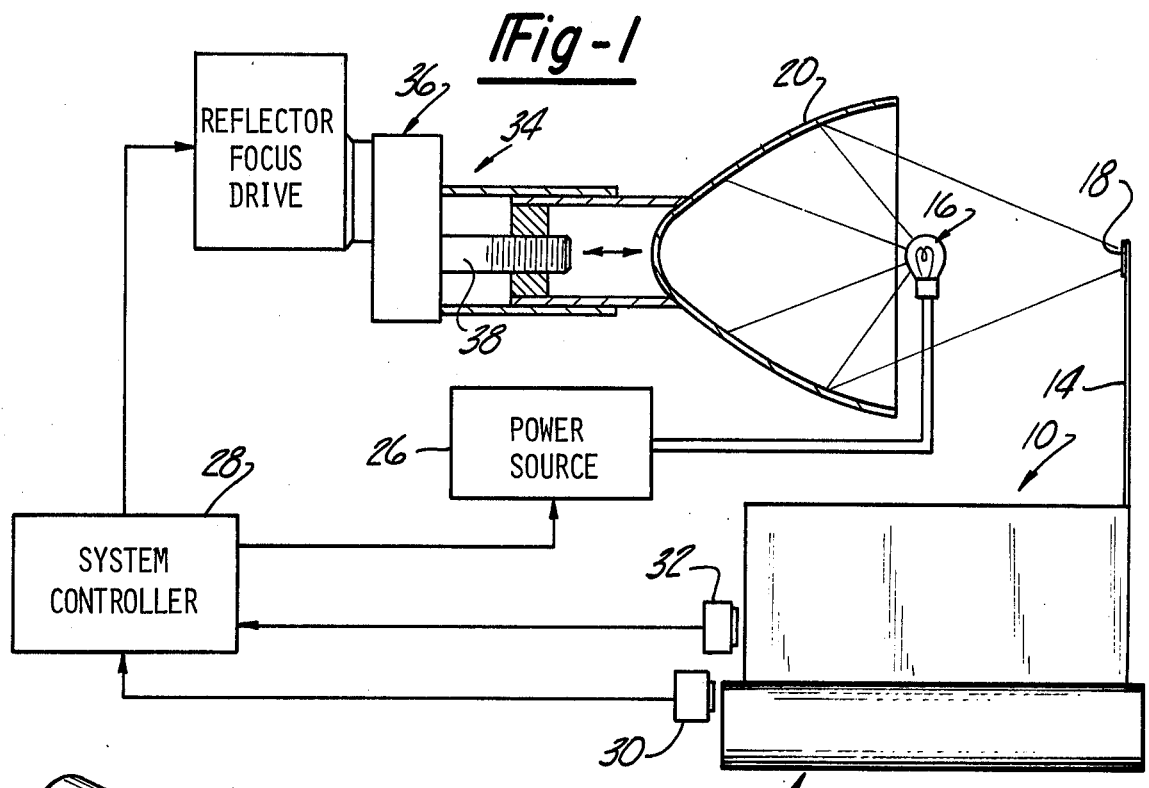
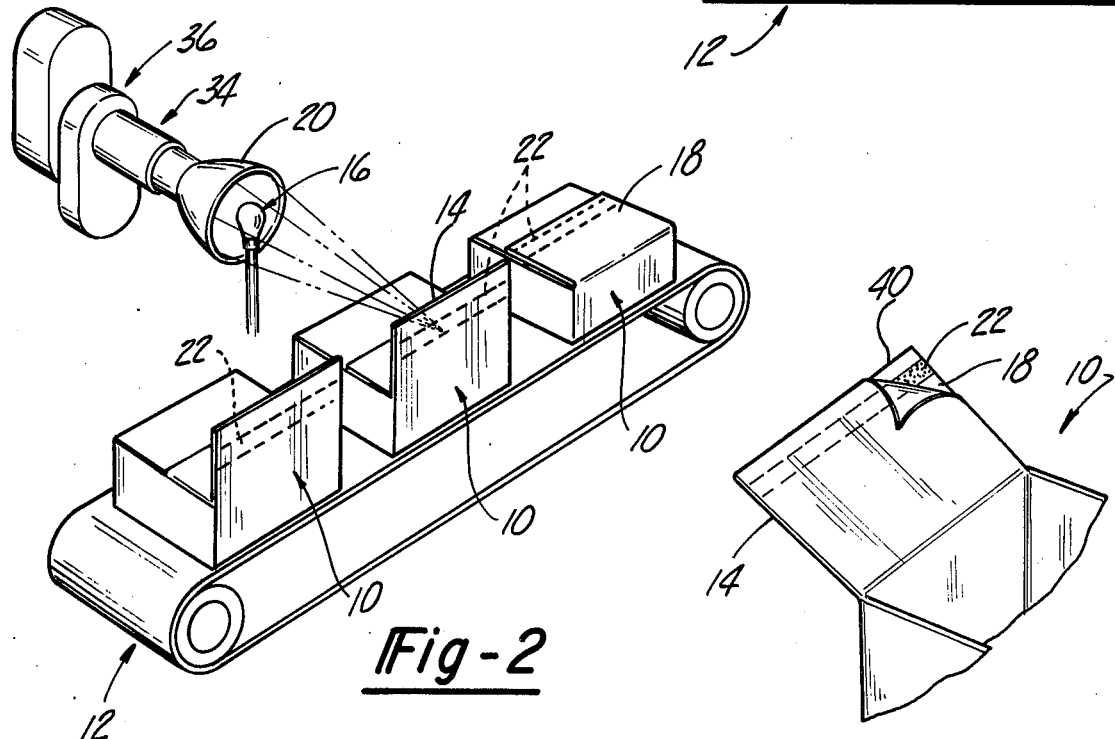

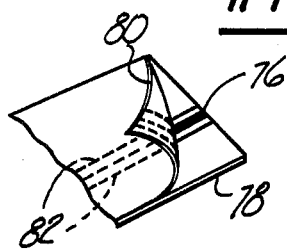
Fig-7
Fig-4
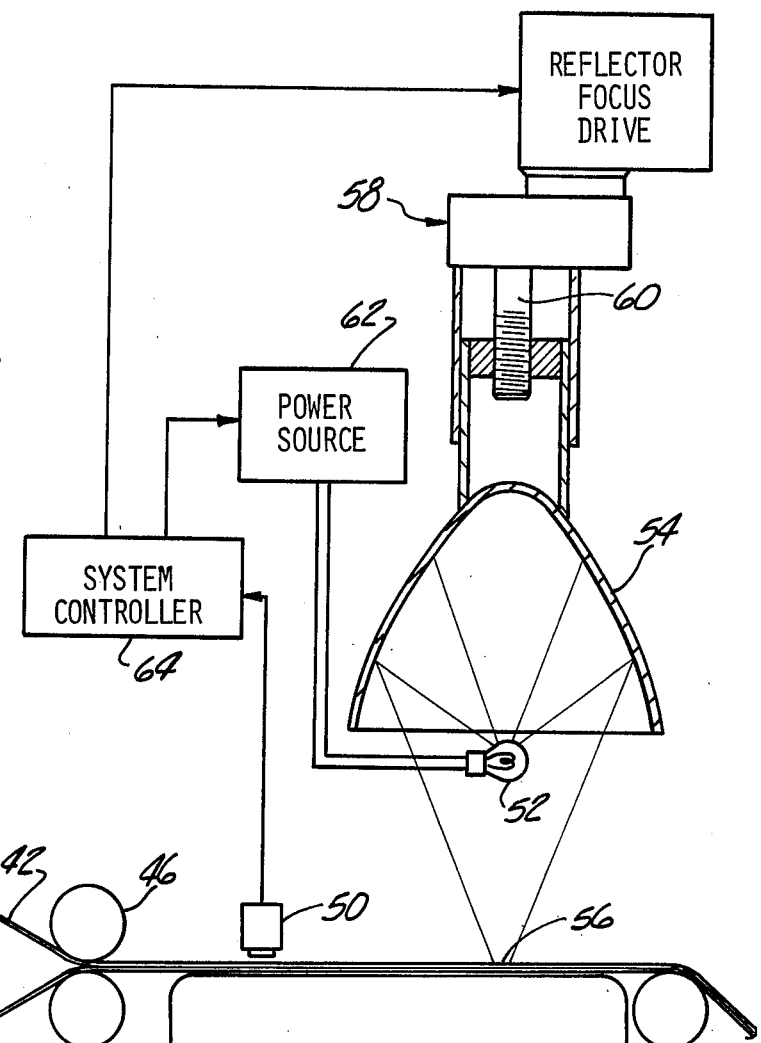
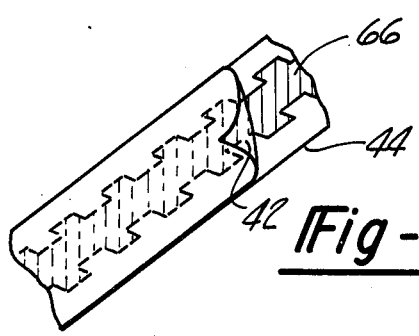
Fig-5
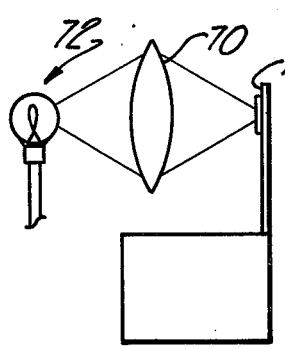
Fig-6

METHOD AND APPARATUS FOR SELECTIVELY HEATING DISCRETE AREAS OF SURFACES WITH RADIANT ENERGY

BACKGROUND OF THE INVENTION

1. Field of the Invention

This invention concerns methods of radiant energy heating of surfaces and apparatus therefor and also their application to such uses as thermal sealing techniques which utilize the direct impingment of radiant energy on the surfaces in order to heat a thermoplastic or other thermally activated adhesive prior to joining or lapping two surfaces which are to be bonded or sealed.

2. Description of the Prior Art

Heat sealing of the surfaces of lapped sheets such as the flaps of cartons has long been known and practiced in the art. As practiced, such heat sealing may take various forms as in the application of a thermoplastic adhesive to one or the other or both of the lapped sheets and the application of heat causing the material to become plastic and with the sheets then lapped as by folding the flaps of the container and upon cooling a sealing of the container flap is obtained. Alternatively, the sheet material may be coated with wax or other thermoplastic coating such as polyethylene which upon being heated acts as a sealant.

The term "thermoplastic" is here being used in the broadest sense, i.e., to indicate any material which softens upon being heated and hardens upon cooling. This is commonly done by the application of heat by means of heating "shoes" which engage the sheet material. However, any contact of the shoe with the thermoplastic coating or adhesive coated side of the sheet causes the shoe to scrape the thermoplastic material from the sheet. Thus, with this approach, it is usual to heat the opposite side of the sheet with the shoe in contact therewith which is inefficient use of the heat energy and also creates a tendency to char the paper since it is difficult to adjust the heat level correctly. The mechanical nature of the system also leads to troublesome maintenance problems in factory installations of the apparatus.

This further precludes the use of board stock which is polyethylene coated on both sides. Double coated polyethylene is required for air exclusion (barrier properties) and for creating packages which may be sealed without the added step of applying (or pre-applying and activating) an adhesive.

Open flame heating is also in current use which offers the advantage of rapid shutoff, but has obvious safety drawbacks.

It has thus heretofore been proposed and practiced that the heating of a thermoplastic material bearing areas of the sheet be carried out by means of the direct application of radiant energy to the surface of the sheet such as is disclosed in U.S. Pat. No. 3,614,914 to Troll. In the arrangement disclosed in that patent, a source of radiant energy is disposed so as to heat thermoplastic material coating areas of the container flap as it passes along a conveyor line prior to the flap being folded to produce a sealed carton. The radiant emissions of the source of radiant energy is, as has usually been utilized to carry out the heating of the material, in the infrared wavelength range. In addition, the heat sources are disclosed as being of a type such that they are "area" sources as distinguished from a "point" source and further involve radiant energy sources which have large mass heating elements which have a high thermal inertia in that the temperature of the elements cannot be quickly changed to vary the intensity of the radiation emission level.

The approach described in the Troll patent can be said to be typical of conventional practice in these three respects, i.e.: the use of infrared range wavelengths of radiant energy; the use of an "area" type radiant energy source; and, the use of high thermal inertia sources.

These characteristics lead to several disadvantages in this context. Firstly, the absorbency of infrared radiation is difficult to control in that such relatively long wavelength radiations tend to penetrate most materials and their energy is absorbed only after passing through a substantial thickness of material. Thus, if one wishes to concentrate the heat energy in the adhesive layer or at the interface between the adhesive layer and the backing sheet, this cannot be very successfully done with infrared radiation. Furthermore, if one attempted to control the area of absorption by placing markings on the sheet material to be sealed, the penetrating characteristics of infrared radiation is such that excessively thick coatings would be required on the sheets.

Alternatively, backing sheets would be required such as are disclosed in U.S. Pat. No. 3,247,041 which discloses an infrared radiant energy source which is absorbed selectively in discrete areas of a backing sheet to indirectly heat the overlying sheets to be sealed together in the region of the marking pattern. Another difficulty encountered in the use of infrared radiation and also in the use of area sources or radiant energy is the impossibility or at least great practical problem of focusing the radiant energy. Although crude reflectors are used to concentrate the radiation, no true focusing of the radiation is possible due to the relatively large area of the source. Such focusing capability would potentially have great utility in this area since firstly more efficient use of the radiant energy would be possible allowing the use of lower-powered sources which would tend to allow lower thermal inertia sources since smaller filament masses which operate at higher temperatures could be utilized; secondly, the area upon which the radiant energy is directed could be quickly varied for applications calling for different areas to be heated by the source by merely adjusting the optics and rapid pattern change could be achieved. Also such variations would allow a ready change in the intensity of the radiation impinging on the surface.

In many cases, the mechanical components of such systems could be simplified by the expedient of focusing the radiant energy.

While infrared radiation can theoretically be focused, it requires elaborate and exotic optical components such as gold-plated reflectors or sodium chloride crystal lens, since the absorption of long wavelength energy by conventional glass lens elements tends to render them inefficient or impractical, particularly at energy levels which would be required for these applications.

These inefficiencies in the application of heat energy by radiant energy sources has heretofore led to the use of high-powered and simultaneously high thermal inertia sources such as quartz rod heaters or heating elements available under the trademark Cal Rod which leads to major difficulties in control over the heat energy being absorbed or applied to the surface heated. Commonly, the stoppage of a continuously operating sealing apparatus, in which the coated sheets or packages are being moved by means of a conveyor or other transport means past the radiation source, leads to overheating and even combustion of the sheets upon stoppage of the sheet material since the high thermal inertia radiant energy source cannot be de-energized with sufficient rapidity to prevent this result.

Another disadvantage is that the relative inefficiency of heating required the heating element to be placed in very close proximity to the surface heated, precluding the use of shutters or other control devices and increasing the fire hazards.

In addition, it would be advantageous if the emissions intensity of the energy source could be varied with sufficient rapidity to continuously correlate the velocity of movement of the sheet material past the energy source with the degree of energy emission of the radiant energy source.

The difficulty in controlling the application pattern and absorption of infrared radiant energy also contributes to the impossibility of controlling the specific areas within which the heating (and sealing) process is carried out, to thus preclude convenient separation of the sealed sheets in those instances where it is desirable that the seal be readily broken, i.e., to open the carton. The thermoplastic material tends typically to be heated indiscriminately by the massive levels of impinging radiant energy to a point where a complete fusing of the layers takes place and it is unfeasible to leave an unsealed area in those instances where the lapped sheets are completely coated with a thermoplastic material such as is common in the plastic coated milk cartons, ice cream cartons or bakery boxes in common use.

Other approaches have been proposed such as described in U.S. Pat. No. 3,461,014 in which the selective absorption is accomplished in the context of a microwave radiant energy source and in which a pattern is placed between the sheets to be sealed which pattern is formed with a microwave radiation absorbing material such as iron oxide dispersed in an ink or dye. However, the use of microwave equipment is not without its difficulties requiring shielding, special safety precautions and is relatively expensive. The use of special additives to the ink would also contribute to increased expenses in the container manufacture albeit this approach does contribute to the very accurate control over the areas on the sheets which receive and absorb the radiant energy and in addition is absorbed at the precise point at which maximum heat energy is desired.

Accordingly, it is an object of the present invention to provide a method and apparatus for efficiently heating discrete areas of a surface as for thermal sealing of lapped sheets by the direct application of radiant energy to at least one and generally both of the lapped sheets in order to soften a thermoplastic material carried on the surface into a plastic condition prior to sealing together the lapped sheets.

It is another object of the present invention to provide such a method and apparatus in which the absorption of the radiant energy may be relatively precisely controlled both as to the area of the surface heated and also as to the depth of the surface at which maximum absorption occurs.

It is yet another object of the present invention to provide such a method and apparatus in which the application of the radiant energy to the thermoplastic material can be very rapidly varied in order to discontinue the heating of the thermoplastic material or so that the degree of heating may be rapidly varied in accordance with the requirements of the particular application.

It is yet another object of the present invention to provide such a method and apparatus in which the area upon which the radiant energy is directed may be readily varied.

It is still another object of the present invention to provide a method and apparatus in which the radiant energy source is inexpensive and safe so as to minimize the safety hazards in the use of the source and also the capital expense involved in providing production facilities.

It is another object of the present invention to provide a means of improving efficiency of the radiant energy heating by enhancing the absorption of radiant energy within discrete areas by means of ordinary printing inks or dyes commonly in use in the printing and production of paperboard materials commonly used in boxes and other paperboard containers of the sort to which the present method and apparatus have particular application.

SUMMARY OF THE INVENTION

These and other objects, which will become apparent upon a reading of the following specification and claims, are accomplished by the use of a radiant energy source in which a significant proportion of the energy of the emissions is focused onto the discrete areas to be heated. The radiant energy source is selected to provide an adequate degree of focusability by a relatively high degree of radiation of wavelengths in the visible and near visible range and further approximates a point source. The radiant energy source is focused onto the discrete areas of the surface to be heated which bear the thermoplastic material. The absorption of the visible wavelength range and near infrared radiant energy is enhanced and selectively controlled by the use of radiation absorbing marking material which is carried by the surface in intimate contact with the thermoplastic material in which absorption of radiant energy and heating is desired. The surface may be entirely coated with a thermoplastic material and the marking substances may be either carried within this thermoplastic material or applied to the coated surface or alternatively an adhesive which is treated with a radiation absorbency enhancing material may be utilized. The use of the point source allows an optical focusing of the radiant energy onto the areas to be heated in which case also allows the adjustment of the focusing optics to vary the area upon which the radiant energy is focused. The resulting efficient application of radiant energy allows the use of relatively lower powered sources such as tungsten filament or arc-type lamp bulbs which are also low thermal inertia sources, with the characteristic of the source allowing the variation in the intensity of the radiant emissions of the radiant energy source at relatively rapid changes in the emission levels such as to permit the near immediate cessation of the radiant energy source and also to allow varying of the intensity of the emissions with the velocity of relative movement of the surface past the radiant energy source or for other requirements of the particular application. Use of the visible wavelength band of the spectrum allows the use of ordinary inks or dyes as absorption enhancing materials, as well as already available lamps as energy sources. The ease with which the absorption and reflection of the visible spectrum range of radiation is controlled allows concentration of the absorption of the radiant energy at a close-to-the-surface depth on the surface heated by the source emissions. The optics used for focusing may be lenses, parabolic reflectors, elliptical reflectors or other shapes of reflectors, mounted for variable area focusing of the energy source, disclosed as a xenon arc, or a quartz halogen cycle filament lamp, a conventional tungsten filament lamp, a metal arc lamp or other highly focusable and intense energy source. Prefocused lamps with integral reflectors intended for projector applications are also suitable.

DESCRIPTION OF THE DRAWINGS

FIG. 1 is a diagrammatic representation of the apparatus according to the present invention which is utilized to carry out the method of thermal sealing of lapped sheets in the context of a carton flap sealing application.

FIG. 2 is a perspective view of a portion of these systems shown in FIG. 1 showing a plurality of successive cartons disclosed on a conveyor line for the purpose of carrying out the sealing of the carton flaps.

FIG. 3 is a perspective view of a carton flap portion which is coated with a transparent thermoplastic coating material which overlies the paperboard flap and is marked in the area within which the sealing is to take place with a radiant energy absorbing marking.

FIG. 4 shows in diagrammatic form the application of the apparatus according to the present invention to the continuous thermal sealing of film or sheet strips.

FIG. 5 is a partial perspective view of the strips with the top layer peeled back to show a radiant energy absorbing pattern imprinted on the lower sheet for the purpose of controlling the area of the strip which is to be thermally sealed to the top strip.

FIG. 6 illustrates diagrammatically an alternate focusing arrangement utilizing a lens.

FIG. 7 illustrates in fragmentary form the formation of a tear strip by selective heating of the thermosealed areas of lapped layers.

DETAILED DESCRIPTION

In the following description, certain specific terminology will be utilized for the sake of clarity and specific embodiments described in accordance with 35 USC 112, but it is to be understood that the same is not intended to be limiting and should not be so construed inasmuch as the concept of the present invention may take many forms and variations within the scope of the appended claims.

Referring to the drawings and particularly FIGS. 1 through 3, these FIGURES depict the application of the present invention to the thermal sealing of paperboard carton flaps in which the carton flaps are sealed shut by the heating of discrete areas of the surfaces of the flaps upon which are disposed thermoplastic material. According to this concept, the cartons are disposed on a conveyor system 12, the cartons 10 adapted to be automatically loaded and unloaded onto the conveyor belt 12 and the thermal sealing process carried out. The remaining parts of the packaging operation both prior to and subsequent to the sealing operation would be integrated into the apparatus shown in FIGS. 1 and 2.

While the illustration of FIGS. 1 and 2 depict in simplified form that portion of the packaging apparatus relating to the thermal sealing of the upper flaps, the lower flaps would be sealed in similar fashion. In addition, in many cases both contacting surfaces would be coated and heated, but for the sake of clarity, the application to the heating and thermal sealing of the upper flap 14 of the carton 10 is depicted as exemplary of the general application of the system.

In this arrangement, a radiant energy source 16 is disposed so as to cause radiant energy to be directed onto the inner surface 18 of the carton flap 14.

The radiant energy source 16 is of a type which emits radiation, the energy of which is carried to a relatively high degree (i.e., 20%) in the visible and near visible (i.e., near infrared) spectrum wavelengths of radiation such as produced by a projector lamp or other intense source as previously noted.

The radiant energy source 16 is disposed adjacent an appropriate reflector 20 of a configuration such as to concentrate and direct by focusing of the radiation emitted by the radiant energy source 16 so as to impinge on a discrete area of the interior surface 18 of the carton flap 14. The radiant energy source 16 may have a filament or arc size such as to approximate an optically defined point source in relation to the reflector 20 or other optics used so as to render its radiation focusable by the optics onto a discrete area of the surface to be heated.

The concentration of the emissions of the radiant energy source 16 by means of a focusing means comprised of the reflector 20, limits and intensifies the area on the inside surface 18 which is caused to be heated by the radiant energy. This effect is had and further controlled by the coating of the interior surface 18 with a radiant energy absorbing pigment or marking within the discrete area 22 (see FIG. 3) which marking is simply provided by printer's ink, carbon black or aniline dyes, etc. since the absorption of visible band wavelength radiation is rather easily controlled by the use of such dyes.

Thus, the combined effect of the focusing and the selective absorption of the discrete areas of the inner flap surface 18 provides very efficient transfer of heat energy into the thermoplastic material which is disposed in the discrete area 22.

It should be noted that the radiant energy source 16 may and typically would emit a major proportion of energy which is not selectively absorbed nor focused, i.e., long wavelength infrared radiation, but the heating effect achieved by such other radiation would be spherically scattered so as to not produce sufficient heating to activate the adhesive in the absence of the absorption of the major proportion of the visible focused radiant energy. This necessary addition of heating energy to the discrete areas thus allows the heating to be controlled by the focusing and the selective marking.

The selective absorption by marking can be accomplished in various ways. As shown in FIG. 3, the entire interior surface of the flap 18 can be coated with a thermoplastic material such as polyethylene plastic with the surface 18 beneath the coating layer 24 being imprinted with the radiation absorbing marking such that the heat absorption on the surface of the flap 18 being in intimate contact therewith beneath the polyethylene coating layer 24 absorbs the majority of heat energy causing the section of the thermoplastic coating 24 immediately above the imprinted area to be heated sufficiently to cause the thermoplastic material to be heated into a plastic condition such that when the flap 14 is folded down subsequent to the heating stage as shown in FIG. 2, the carton 10 is sealed upon recooling of the thermoplastic material in the layer 24. The marking of the discrete areas may also be accomplished by dyeing the coating layer 24, or by the application of a pigmented thermoplastic adhesive in the discrete area only.

This use of selectively absorbent markings is thus distinguished from the use of backing sheets and infrared radiation in that the layer to be sealed itself may be marked with the material to be heated in tight adherence to the discrete surface areas, improving the transfer of heat energy from the marked subsurface into the coating to be heated.

The efficient use of radiant energy source 16 arising from its characteristic as a focusable optical point source also having the energy of the radiant emissions having a substantial proportion of emissions in the visible wavelength range which allows concentration of the heating effect, allows the radiant energy source to be of a lower power and low thermal inertia design, i.e., having a low mass filament. This in turn makes possible the optional incorporation of the control system components which can rapidly vary the application of the radiant energy source both in intensity and in the area of focus so as to in turn control the intensity of heating produced as with line speed and also to allow immediate changeover between the different package configurations requiring a greater or lesser area of thermal treatment.

This control would be carried out by the use of energization means varying the power supplied to the radiant energy source 16 in accordance with system requirements such as the speed with which the conveyor belt 12 is moving relative to the radiant energy source 16. Also, if the area into which the radiation is focused in enlarged or reduced, the intensity level for a given line speed may be varied. Similarly, differences in the thermal characteristics or thickness of the thermoplastic material or absorption characteristics of the markings may be readily accommodated.

The focus area of the reflector 20, on the other hand, is varied by laterally displacing the reflector 20 relative to the radiant energy source 16 so as to vary the area of convergency of the radiation reflected by the reflector 20. Alternatively, the position of the source 16 may be adjusted.

These components are depicted diagrammatically in FIG. 1 in which power source 26 for the radiant energy source 16 is controlled by a system controller 28 which in turn is responsive to various system detectors such as a line speed detector 30 and a carton presence detector 32 which may also detect the type or size of the carton 10 which information is sensed by the system controller 28 to appropriately vary the intensity of the radiant energy source 16 by control over its power source 26. The system controller also exercises control over a reflector focus drive mechanism 34 shown as a mechanical drive 36 which by rotation of a screw thread 38 produces a change in the relative position of the reflector 20 with respect to the energy source 16 as indicated.

Of course, many other control parameters could be utilized in controlling these two variables of the system such as sensed temperature levels of the heated area, etc.

Manual control of course may also be utilized in applications not having a need for such sophistication.

The design of these various components may be of conventional construction and since their specific design such as parabolic or elliptical reflectors does not per se comprise the present invention, and are well within the state of the art, details of these are not here included.

The use of the radiant energy source 16 having a relatively high proportion of visible wavelength emission allows very good control over the reflectivity and absorbtivity of the radiation, which as noted above allows the radiant energy to be absorbed at precisely the desired level in the layering of the adhesive and/or thermoplastic coating on the paper by the location of the marking material. Also, it allows the use of variations in the shading or darkness of the coating of printing materials to vary the degree of heat absorption. If such variations are utilized, the control over the power supply 26 by the system controller can be used to vary the intensity of the radiant emission of the radiant energy source 16 to produce the appropriate heating effect.

Similarly, the type and size of carton detector 20 allow the rapid changeover to a different area and furthermore the location of the area upon which the radiant energy is focused could be conveniently accommodated by simple reflector systems and/or optical systems allowing for redirecting of the radiant energy to different locations on the surfaces to be heated.

The focus capability also allows a relatively remote positioning of the surface to be heated allowing the use of shutters, etc.

This situation is contrasted with the prior art infrared sources, in which the focusing and/or control of absorbtivity and reflectivity as well as the difficulty in changing rapidly the intensity of emission of the sources precludes the control. The control over the area which is thermally affected by the radiation allows the field area to be closely confined to those desired areas as contrasted to the heat sources described above in conjunction with the prior art description, such that separate unsealed tear strips 40 are possible enabling the seal to be broken by convenient gripping of the tear strips 40. This also assures that there is no overheating of the underlying layers and the use of energy is optimal as a by-product of the excellent control afforded by the present invention.

The inventive concept is, of course, applicable to other situations other than the sealing of carton flaps and may be used, for example, to fuse continuous strips of film to provide laminated layers in which a predetermined pattern of sealing may be desired. Another use would be to fuse layers of corrugated polyethylene or polyethylene-coated stock to a coated or uncoated base sheet. This is depicted diagrammatically in FIG. 4 in which a first strip 42 and a second strip 44 are positioned into overlapping relationship by being fed through a pair of rollers 46 and onto a platform support 48. A line speed detector 50 is used to detect the speed with which the lapped strips 42 and 44 are being transported past a radiant energy source 52 with a focusing reflector 54 provided in similar fashion as in the above-described embodiment. This concentrates much of the emitted radiant energy into an area 54 on the lapped sheets 42 and 44. A mechanical drive 58 is provided which rotates the screw shaft 60 in similar fashion to move the reflector 54 upward and downward displacing it relative to the radiant energy source 52. A lamp power source 62 is provided in similar fashion with the mechanical drive 58 and power source 62 both controlled by a system controller 64 which may be responsive to the line speed detector 50 in similar fashion to the above-described embodiment and also may be responsive to other system variables such that the intensity of energization of radiant energy source 52 and the focus area of the optical train varies the area of relatively intense radiant heating by the radiant energy source 52. This application may take even greater advantage of the design features afforded by the present invention since the continuous nature of the process may demand rapid change in the intensity of the radiant energy source 52 which as described can be very effectively carried out by this arrangement.

The strips 42 and 44 are shown in FIG. 5 which the lower sheet 44 is marked with a relatively intricate pattern 66 as by a marker 68 shown in FIG. 4, the sheet 42 being relatively transparent to the emitted radiation such that an intricate thermal sealing pattern is produced.

The focusing can of course be carried out with the use of a lens 70 as shown in FIG. 6, interposed between a radiant energy source 72 and the surface 74 to be heated.

Tear strips can also be easily formed as shown in FIG. 7, in which all but a narrow band 76 of layer 78 is marked, leaving that band unsealed to an upper layer 80 upon selective heating. The corresponding areas of the upper layer can be perforated at 82 so that a tear strip is formed, allowing ready removal of the strip, as is done in many package designs to enable opening of the package.

Accordingly, it can be seen that the present invention accomplishes the objects recited above since the combination of the radiant energy source emitting a relatively high proportion of visible wavelength radiant which is focused produces a high efficiency heating in turn making possible a rapid control of the heating produced by a lower thermal inertia radiant energy source. This characteristic in conjunction with the focusing arrangement produced by the reflector or alternatively optical lens system can be relatively quickly varied by shifting of the convergency of the radiation used by the optics and the relatively slight movement of the optical components to either discontinue heating by diffusion of the radiant energy or to vary the area of heating such that overheating or underheating may be avoided and an efficient use of energy may be had since its application can be very effectively controlled.

The nature of the visible wavelength radiant energy source 16 also allows very precise control over the depth in the layering at which the radiant energy is absorbed and the heat generated since visible band wavelength light absorption or reflection is very easily controlled by the use of ordinary dyes or inks so that the heat is concentrated at the point at which maximum thermal effect is required, so as to further enhance the efficiency of the process. Since the area and the intensity of the heating on the surface areas may be rapidly and conveniently shifted, changeover to different applications or operational conditions of the systems, such as increased or decreased line speeds, etc., is possible.

The embodiments of the invention in which an exclusive property or privilege is claimed are defined as follows:

1. A method of sealing lapped surfaces, at least one of said surfaces having an area of thermoplastic material, the method including the steps of:
   marking said at least one surface with radiant energy absorbing markings to be absorbent in the visible wavelength range;
   energizing a source of non-laser radiant energy having a substantial proportion of non-laser emissions of visible range wavelength, said source disposed so as to direct said visible range wavelength emissions onto said at least one surface having said marked area of thermoplastic material;
   variably focusing said visible range wavelength emissions onto said thermoplastic marked only area;
   heating said marked area into a plastic condition by impingement thereon of said visible range wavelength emissions;
   lapping said surfaces with said thermoplastic area of said at least one surface in contact with the other of said surfaces while said thermoplastic material is in a plastic condition, whereby said sealing is carried out.

2. The method according to claim 1 further including relatively displacing said at least one surface relative to said radiant energy source to cause focusing of said radiant energy along successive regions of said area of thermoplastic material.

3. The method according to claim 2 wherein in said step of relatively displacing said at least one surface with respect to said radiant energy source, the rate of relative displacing of said at least one surface with respect to said radiant energy source is varied, and wherein in said energization step, the intensity of visible wavelength emissions impinging on said surface is varied in correspondence therewith.

4. The method according to claim 1 wherein said at least one surface is coated with a transparent thermoplastic material.

5. The method according to claim 1 wherein in said focusing step said area upon which said radiant energy is focused is varied in accordance with the size of said discrete areas.

6. The method according to claim 1 wherein said at least one surface is covered with a thermoplastic transparent layer and the said one surface in the region of said discrete area is marked with a marking which is absorbent of said radiant energy whereby said thermoplastic material may be rendered plastic in said discrete areas by absorption of said radiant energy in said discrete areas of said one surface.

* * * * *